United States Patent
Harrington (10) Patent No.: US 9,616,330 B1
(45) Date of Patent: Apr. 11, 2017

(54) SYSTEM AND METHOD FOR UPDATING A GAME STATE IN AN ONLINE GAME

(71) Applicant: KABAM, INC., San Francisco, CA (US)

(72) Inventor: Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 315 days.

(21) Appl. No.: 13/907,755

(22) Filed: May 31, 2013

(51) Int. Cl.
- *A63F 13/69* (2014.01)
- *A63F 13/30* (2014.01)
- *A63F 13/44* (2014.01)
- *A63F 13/49* (2014.01)

(52) U.S. Cl.
CPC ............ *A63F 13/12* (2013.01); *A63F 13/69* (2014.09); *A63F 13/44* (2014.09); *A63F 13/49* (2014.09)

(58) Field of Classification Search
CPC .......... A63F 13/12; A63F 13/30; A63F 13/40; A63F 13/45; A63F 13/47; A63F 13/50; A63F 13/55; A63F 13/69; A63F 2300/30; A63F 2300/40; A63F 2300/50; A63F 2300/51; A63F 2300/53; A63F 2300/554; A63F 2300/6009; A63F 2300/6045; A63F 2300/609; A63F 2300/63; A63F 2300/65; A63F 13/44; A63F 13/49; A63F 13/56
See application file for complete search history.

(56) References Cited

U.S. PATENT DOCUMENTS

| | | | |
|---|---|---|---|
| 7,445,549 B1 | 11/2008 | Best | |
| 8,147,339 B1 | 4/2012 | Perry | 463/42 |
| 8,287,341 B1 | 10/2012 | Reynolds et al. | 463/9 |
| 2003/0078103 A1* | 4/2003 | LeMay et al. | 463/43 |
| 2005/0192098 A1 | 9/2005 | Guo | |
| 2007/0270225 A1 | 11/2007 | Wang et al. | 463/42 |
| 2008/0070688 A1 | 3/2008 | Loehrer | |
| 2012/0059783 A1 | 3/2012 | Fiedler | 706/46 |
| 2012/0072485 A1 | 3/2012 | Hutcheson et al. | 709/203 |
| 2013/0047217 A1 | 2/2013 | Shuster et al. | 726/4 |

OTHER PUBLICATIONS

Electronic Arts Inc, EA Sports Madden 2002 game manual, 2001.*

\* cited by examiner

*Primary Examiner* — Damon Pierce
(74) *Attorney, Agent, or Firm* — Sheppard Mullin Richter & Hampton LLP (57) ABSTRACT

A game server may maintain a game state for an online game. The game state may represent a plurality of game state attributes and attribute values of a virtual world in which an online game takes place. One or more game state attributes may be related to another game state attribute, whereby changing a value for a first game state attribute may affect the values available to a second game state attribute. A command entered by a first player may affect a first game state attributes (and, accordingly, one or more other game state attributes). To ensure consistency in the way that the virtual world of the online game is presented to other players, one or more related game state attributes may be locked along with the first game state attribute when executing the first command.

17 Claims, 4 Drawing Sheets

| ATTRIBUTE IDENTIFIER | RELATED ATTRIBUTES |
|---|---|
| 1 | 2, 3, 4, 6, 7 |
| 2 | 1, 4, 5 |
| 3 | 1, 4, 6 |
| 4 | 1, 2, 3, 7 |
| 5 | 2 |
| 6 | 1, 3 |
| 7 | 1, 4 |

| ATTRIBUTE IDENTIFIER | RELATED ATTRIBUTES |
|---|---|
| 1 | 2, 3, 4, 6, 7 |
| 2 | 1, 4, 5 |
| 3 | 1, 4, 6 |
| 4 | 1, 2, 3, 7 |
| 5 | 2 |
| 6 | 1, 3 |
| 7 | 1, 4 |

SYSTEM AND METHOD FOR UPDATING A GAME STATE IN AN ONLINE GAME

FIELD

The disclosure relates to locking related game state attributes when updating a game state attribute based on receipt of a command from a player in an online game.

BACKGROUND

The disclosure relates to locking related game state attributes when updating a game state attribute based on receipt of a command from a player in an online game. Various techniques for updating a game state for the online game are known. For example, conventional systems may execute commands from different users and update a global game state based on execution of those commands. Conventional systems may code game state information and relate sequential instructions to reduce the amount of information communicated between a client device and a game server. Yet other conventional systems may determine whether a player may engage with an artificial intelligence asset in an online game based on a decision tree that indicates the actions of the asset and the interactions with other assets.

Conventional systems, however, suffer from various drawbacks and inefficiencies relating to updating a game state for an online game. For example, conventional systems may fail to consider the effect of updating a single game state attribute in a game state on other attributes. To that end, conventional systems may fail to lock related game state attributes when updating a game state attribute based on receipt of a command from a player in an online game.

SUMMARY

One aspect of the disclosure relates to locking related game state attributes when updating a game state attribute based on receipt of a command from a player in an online game. A game server may maintain a game state for an online game. The game state may represent a plurality of game state attributes and attribute values of a virtual world in which the online game takes place. One or more game state attributes may be related to another game state attribute, whereby changing a value for a first game state attribute may affect the values available to a second game state attribute. The online game may be played by a plurality of players via a respective plurality of client computing devices. A command entered by a first player may affect a first game state attributes (and, accordingly, one or more other game state attributes). To ensure consistency in the way that the virtual world of the online game is presented to other players, one or more related game state attributes may be locked along with the first game state attribute when executing the first command.

A system may be configured to update a game state in an online game. The system may comprise, for example, a game server comprising one or more physical processors. The physical processors may be configured to execute computer program modules. The computer program modules may comprise, for example, a space module, a command reception module, an attribute locking module, a command execution module, and/or other computer program modules.

A space module may be configured to execute an instance of a virtual space, and to implement the instance of the virtual space to facilitate participation by one or more players in the online game within the virtual space through one or more client computing platforms associated with the one or more players.

A command reception module may be configured to receive a first command from a first player of the one or more players. The command may affect a first game state attribute of a plurality of game state attributes of a game state of the online game.

An attribute locking module may be configured to lock the first game state attribute responsive to a determination that the first command affects the first game state attribute of the game state. The attribute locking module may be configured to determine whether one or more other game state attributes of the game state are related to the first game state attribute. Responsive to a determination that a subset of game state attributes of the one or more other game state attributes are related to the first game state attribute, the attribute locking module may be configured to place a lock on individual ones of the subset of game state attributes.

A command execution module may be configured to execute the first command, and remove the locks on the first game state attribute and the subset of related game state attributes subsequent to the execution of the first command.

A computer-implemented method for updating a game state in an online game may be implemented in a computer system comprising one or more physical processors. The method may comprise: executing an instance of a virtual space; implementing the instance of the virtual space to facilitate participation by the one or more players in a game within the space by determining view information from the instance and transmitting the view information to one or more client computing platforms associated with the one or more players that facilitate presentation of views of the virtual space to the one or more players by the one or more client computing platforms; receiving a first command from a first player of the one or more players, wherein the command affects a first game state attribute of a plurality of game state attributes of a game state of the online game; responsive to a determination that the first command affects the first game state attribute of the game state, locking the first game state attribute; determining whether one or more other game state attributes of the game state are related to the first game state attribute; responsive to a determination that a subset of game state attributes of the one or more other game state attributes are related to the first game state attribute, placing a lock on individual ones of the subset of game state attributes; executing the first command; and removing the locks on the first game state attribute and the subset of related game state attributes subsequent to execution of the first command.

A non-transitory electronic storage media may store information related to updating a game state in an online game. The stored information may comprise a memory configured to store information related to the online game and instructions configured to cause a client computing platform to: execute an instance of a virtual space; implement the instance of the virtual space to facilitate participation by the one or more players in the online game within the virtual space by determining view information from the instance and transmitting the view information to one or more client computing platforms associated with the one or more players that facilitate presentation of views of the virtual space to the one or more players by the one or more client computing platforms; receive a first command from a first player of the one or more players, wherein the command affects a first game state attribute of a plurality of game state attributes of a game state of the online game; responsive to a determination that the first command affects the first game state attribute of the game state, lock the first game state attribute; determine whether one or more other game state attributes of the game state are related to the first game state attribute; responsive to a determination that a subset of game state attributes of the one or more other game state attributes are related to the first game state attribute, place a lock on individual ones of the subset of game state attributes execute the first command; and remove the locks on the first game state attribute and the subset of related game state attributes subsequent to the execution of the first command.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
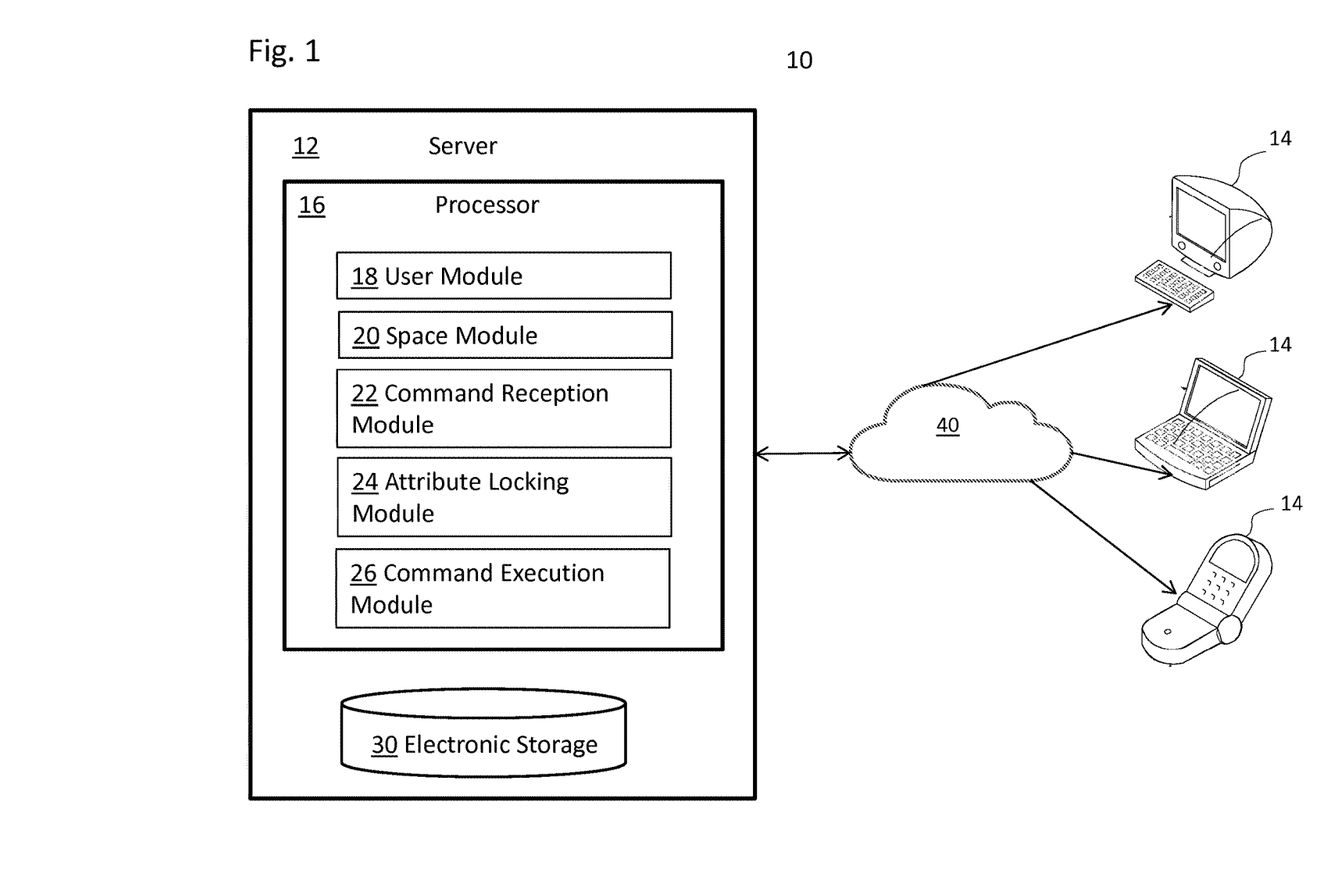
FIG. 1 illustrates a system configured to update a game state in an online game, according to various aspects of the invention.

FIG. 1 illustrates a system 10 configured to update a game state in an online game. In some implementations, system 10 may include a game server 12. The game server 12 may be configured to communicate with one or more client computing platforms 14 according to a client/server architecture. The users may access system 10 and/or the virtual space via client computing platforms 14.

The game server 12 may be configured to execute one or more computer program modules. The computer program modules may include one or more of a user module 18, a space module 20, a command reception module 22, an attribute locking module 24, a command execution module 26, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 20 may be configured to implement the instance of the virtual space executed by the computer modules to determine state of the virtual space. The state may then be communicated (e.g., via streaming visual data, via object/position data, and/or other state information) from game server 12 to client computing platforms 14 for presentation to users. The state determined and transmitted to a given client computing platform 14 may correspond to a view for a user character being controlled by a user via the given client computing platform 14. The state determined and transmitted to a given client computing platform 14 may correspond to a location in the virtual space. The view described by the state for the given client computing platform 14 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 20 is not intended to be limiting. The space module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through game server 12 (e.g., through space module 20).

A command reception module 22 may be configured to receive a first command from a first player of the one or more players. The command reception module 22 may receive a command that based on an input of a user at a client computing platform 14. The command may facilitate participation by a player in the instance of the virtual space by controlling one or more of the available user controlled elements in the virtual space.

The command may affect a first game state attribute of a plurality of game state attributes of a game state of the online game. As mentioned above, the game state may represent a plurality of game state attributes and attribute values of a virtual world in which the online game takes place. One or more game state attributes may be related to another game state attribute, whereby changing a value for a first game state attribute may affect the values available to a second game state attribute. The game state may comprise game state information related to the plurality of game state attributes. For example, game state information related to an individual game state attribute may comprise an identifier for the individual game state attribute, a value associated with the individual game state attribute, a lock indication indicating whether the game state attribute has been locked, relationship information for the individual game state attribute, and/or other information related to the individual game state attribute.

Figure 2A:
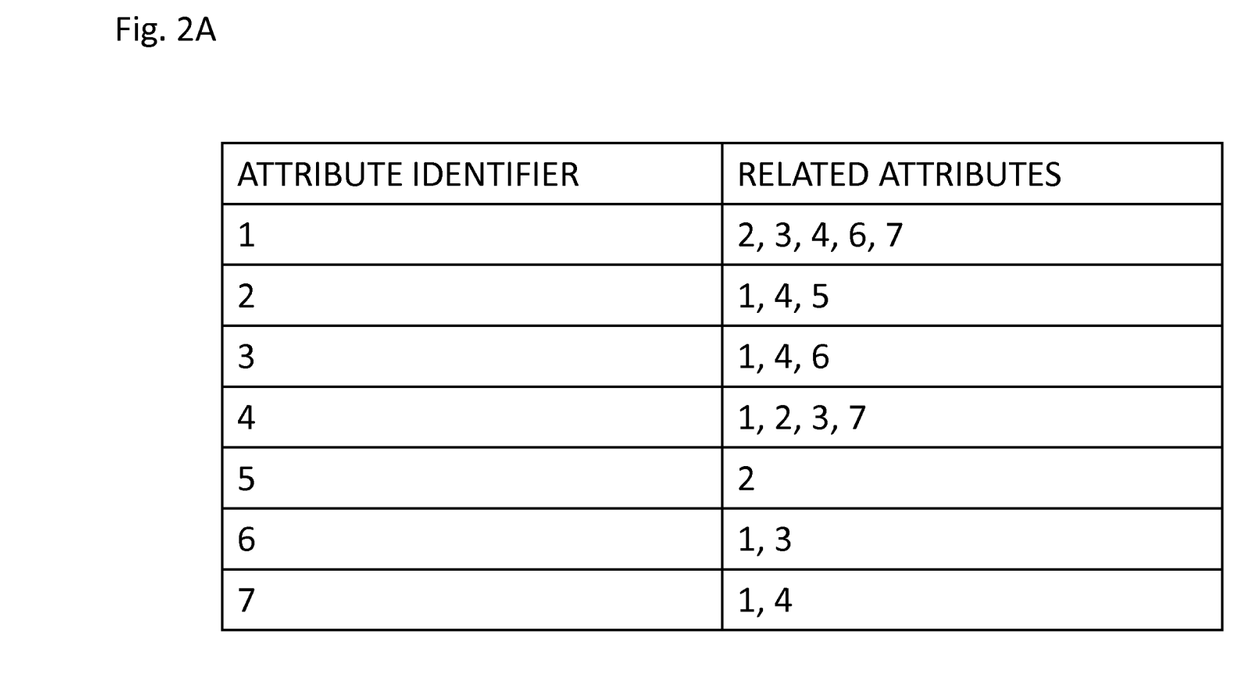
FIG. 2A illustrates an exemplary depiction of relationship information for game state attributes in a game state, according to various aspects of the invention.

In some implementations, the relationship information for an individual game state attribute may comprise a list of one or more game state identifiers associated with respective one or more game state attributes related to the individual game state attribute. FIG. 2A illustrates an exemplary depiction of relationship information for game state attributes in a game state. As shown in FIG. 2A, for each individual game state attribute, the relationship information may comprise a list of one or more game state identifiers associated with the respective individual game state attribute.

Figure 2B:
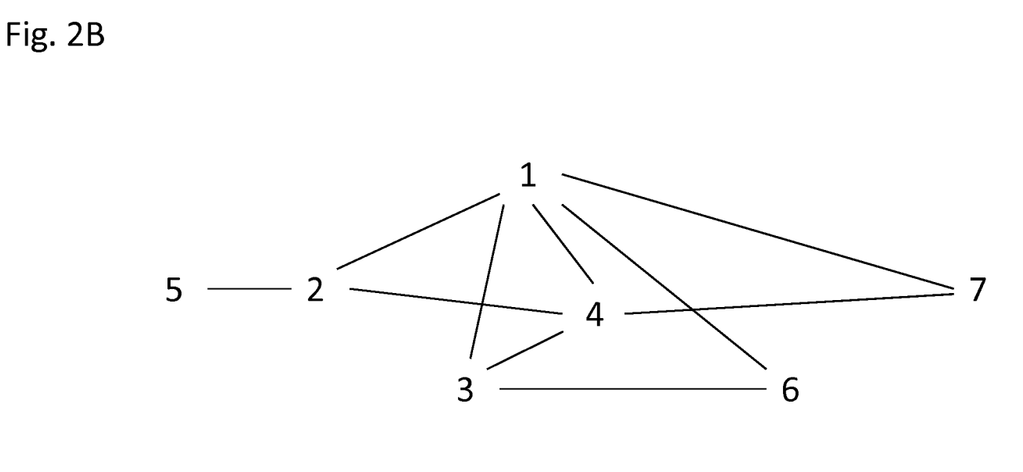
FIG. 2B illustrates an exemplary depiction of relationship information for game state attributes in a game state, according to various aspects of the invention.

In some implementations, the relationship information for the individual game state attribute may comprise a position in a hierarchical tree comprising the plurality of game state attributes. FIG. 2B illustrates an exemplary depiction of relationship information for game state attributes in a game state. As shown in FIG. 2B, the plurality of game state attributes are depicted as connected to each other in a tree structure. For each individual game state attribute, the relationship information may comprise a position in a hierarchical tree comprising the plurality of game state attributes. A subset of game state attributes related to the first game state attribute may comprise one or more game state attributes connected to the first game state attribute in the tree.

An attribute locking module 24 may be configured to lock the first game state attribute responsive to a determination that the first command affects the first game state attribute of the game state. The game state attributes may be accessed by a plurality of commands from one or more client computing platforms 14. In some implementations, game state information for an individual game state attribute may also comprise a command queue associated with the lock indication. Responsive to a determination that the lock indication for the individual game state attribute indicates that the game state attribute has been locked, the attribute locking module 24 may be configured to place the command that wants to lock the individual game state attribute in the command queue. Responsive to a determination that the command for which the individual game state attribute was locked has been executed, the command execution module 26 may remove the lock on the individual game state attribute. The attribute locking module 24 may then place a lock on the individual game state attribute for the first command in the command queue. Accordingly, the attribute locking module 24 and command executing module 26 may place and remove locks on the individual game state attribute responsive to an order of individual commands in the command queue. For example, the attribute locking module 24 may be configured to lock the first game state attribute by determining whether a lock indication associated with the first game state attribute indicates that the first game state attribute has been locked. Responsive to a determination that the lock indication indicates that the first game state attribute has been locked, the attribute locking module 24 may place the command in a queue associated with the first game state attribute for locking the first game state attribute.

The attribute locking module 24 may be configured to determine whether one or more other game state attributes of the game state are related to the first game state attribute. For example, the attribute locking module 24 may determine one or more game state attributes that are related to the first game state attribute based on the relationship information associated with the first game state attribute. In a manner similar to locking the first game state attribute, the attribute locking module 24 may place locks on the individual game state attributes in the subset of game state attributes. For example, responsive to a determination that a subset of game state attributes of the one or more other game state attributes are related to the first game state attribute, the attribute locking module 24 may be configured to place a lock on the subset of game state attributes. The attribute locking module 24 may also be configured to place a lock on the subset of game state attributes. The attribute locking module 24 may determine, for individual ones of the subset of game state attributes, whether a lock indication associated with the individual game state attribute indicates that the first game state attribute has been locked. Responsive to a determination that the lock indication indicates that the individual game state attribute has been locked, the attribute locking module 24 may the command in a queue associated with the individual game state attribute for locking the individual game state attribute.

A command execution module 26 may be configured to execute the first command, and remove the locks on the first game state attribute and the subset of related game state attributes. The command execution module 26 may determine whether a lock has been placed on the first game state attribute corresponding to the command to the executed and whether locks have been placed on the respective subset of game state attributes corresponding to the command to be executed. Responsive to a determination that the command to be executed is in a command queue for one or more individual game state attributes, the command execution module 26 may wait to execute the command. The command execution module 26 may execute the first command responsive to a determination that respective locks corresponding to the command to be executed have been placed on the first game state attribute and the subset of game state attributes. Responsive to a determination that the first command has been executed, the command execution module 26 may remove the locks on the first game state attribute and the subset of related game state attributes.

The game server 12 may include electronic storage 30, one or more processors 16, and/or other components. The game server 12 may include communication lines, or ports to enable the exchange of information with a network and/or other computing platforms. Illustration of game server 12 in FIG. 1 is not intended to be limiting. The game server 12 may include a plurality of hardware, software, and/or firmware components operating together to provide the functionality attributed herein to game server 12. For example, game server 12 may be implemented by a cloud of computing platforms operating together as game server 12.

Electronic storage 30 may comprise electronic storage media that electronically stores information. The electronic storage media of electronic storage 30 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, and 26. Processor 16 may be configured to execute modules 18, 20, 22, 24, and 26 by software; hardware; firmware; some combination of software, hardware, and/or firmware; and/or other mechanisms for configuring processing capabilities on processor 16.

It should be appreciated that although modules 18, 20, 22, 24, and 26 are illustrated in FIG. 1 as being co-located within a single processing unit, in implementations in which processor 16 includes multiple processing units, one or more of modules 18, 20, 22, 24, and 26 may be located remotely from the other modules. The description of the functionality provided by the different modules 18, 20, 22, 24, and 26 described below is for illustrative purposes, and is not intended to be limiting, as any of modules 18, 20, 22, 24, and 26 may provide more or less functionality than is described. For example, one or more of modules 18, 20, 22, 24, and 26 may be eliminated, and some or all of its functionality may be provided by other ones of modules 18, 20, 22, 24, and 26 As another example, processor xx may be configured to execute one or more additional modules that may perform some or all of the functionality attributed below to one of modules 18, 20, 22, 24, and 26

Figure 3:
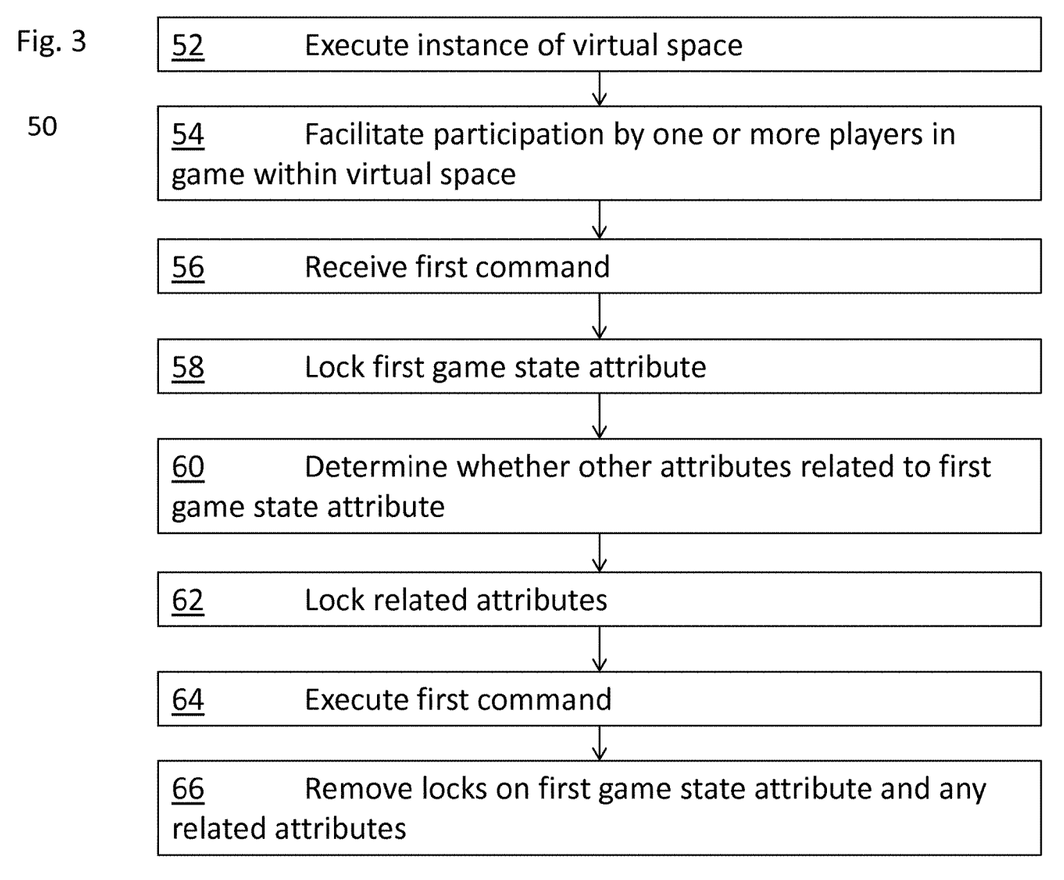
FIG. 3 illustrates an exemplary method of updating a game state in an online game, according to various aspects of the invention.

FIG. 3 illustrates a method 50 of locking related game state attributes when updating a game state attribute based on receipt of a command from a player in an online game. The operations of method 50 presented below are intended to be illustrative. In some embodiments, method 50 may be accomplished with one or more additional operations not described, and/or without one or more of the operations discussed. Additionally, the order in which the operations of method xx are illustrated in FIG. 3 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method xx.

At an operation 52, an instance of a virtual space may be executed. In some implementations, operation 50 may be performed by a space module the same as or similar to space module 20 (shown in FIG. 1 and described above).

At an operation 54, the executed instance of the virtual space may be implemented to determine view information. The view information may define views to be presented to users via client computing platforms. In some implementations, operation 52 may be performed by a space module the same as or similar to space module 20 (shown in FIG. 1 and described above).

At an operation 56, a first command may be received. In some implementations, operation 56 may be performed by a command reception module the same as or similar to command reception module 22 (shown in FIG. 1 and described above).

At an operation 58, a first game state attribute affected by the first command may be locked. In some implementations, operation 58 may be performed by an attribute locking module the same as or similar to attribute locking module 24 (shown in FIG. 1 and described above).

At an operation 60, a determination may be made as to whether one or more other game state attributes are related to the first game state attribute. In some implementations, operation 60 may be performed by an attribute locking module the same as or similar to attribute locking module 24 (shown in FIG. 1 and described above).

At an operation 62, responsive to a determination that the first game state attribute is related to one or more other game state attributes, the one or more other game state attributes may be locked. In some implementations, operation 62 may be performed by an attribute locking module the same as or similar to attribute locking module 24 (shown in FIG. 1 and described above).

At an operation 64, the first command may be executed. In some implementations, operation 64 may be performed by a command execution module the same as or similar to command execution module 26 (shown in FIG. 1 and described above).

At an operation 66, responsive to a determination that the first command was execute, the locks on the first game state attribute and the one or more other attributes may be removed. In some implementations, operation 66 may be performed by a command execution module the same as or similar to command execution module 26 (shown in FIG. 1 and described above).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for updating a game state in an online game, the system comprising:
 a game server comprising one or more physical processors configured by machine-readable instructions to:
  execute an instance of a virtual space, and to implement the instance of the virtual space to facilitate participation by one or more players in the online game within the virtual space through one or more client computing platforms associated with the one or more players;
  receive a plurality of commands from the one or more players, the plurality of commands including a first command from a first player and a second command from a second player;
  determine one or more game state attributes of a plurality of game state attributes the first command affects, wherein the first command affects a first game state attribute of the game state of the online game;
  responsive to a determination that the first command affects the first game state attribute of the game state, lock the first game state attribute;
  determine whether one or more other game state attributes of the game state are related to the first game state attribute;
  responsive to a determination that a subset of game state attributes of the one or more other game state attributes are related to the first game state attribute, place a lock on individual ones of the subset of game state attributes;
  determine one or more of the game state attributes of the plurality of game state attributes the second command affects, wherein the second command affects the first game state attribute of the game state of the online game;
  determine whether a lock indication associated with the first game state attribute indicates that the first game state attribute is locked;
  responsive to the lock indication associated with the first game state attribute indicating that the first game state attribute is locked, hold the second command such that the second command is not immediately executed within the online game;
  execute the first command; and
  remove the locks on the first game state attribute and the subset of related game state attributes subsequent to execution of the first command.

2. The system of claim 1, wherein the game state comprises game state information related to the plurality of game state attributes, wherein game state information related to an individual game state attribute comprises an identifier for the individual game state attribute, a value associated with the individual game state attribute, the lock indication indicating whether the game state attribute has been locked, and relationship information for the individual game state attribute.

3. The system of claim 2, wherein the relationship information for the individual game state attribute may comprise a list of one or more game state identifiers associated with respective one or more game state attributes related to the individual game state attribute.

4. The system of claim 2, wherein the relationship information for the individual game state attribute may comprise a position in a hierarchical tree comprising the plurality of game state attributes.

5. The system of claim 4, wherein the subset of game state attributes related to the first game state attribute comprises:
 one or more game state attributes connected to the first game state attribute in the hierarchical tree.

6. The system of claim 1, wherein the one or more physical processors are further configured by machine-readable instructions to lock the first game state attribute by:
 responsive to a determination that the lock indication indicates that the first game state attribute has been locked, placing the second command in a queue associated with the first game state attribute.

7. The system of claim 6, wherein the one or more physical processors are further configured by machine-readable instructions to place the lock on the subset of game state attributes by:
 determining, for individual ones of the subset of game state attributes, whether lock indications associated with the individual ones of the subset of game state attributes indicate that the individual ones of the subset of game state attributes have been locked;
 responsive to a determination that the lock indications indicate that the individual ones of the subset of game state attributes have been locked, placing the second command in a queue associated with the individual ones of the subset of game state attributes.

8. The system of claim 7, wherein the one or more physical processors are further configured by machine-readable instructions configured to execute the first command by:

executing the first command responsive to a determination that the lock has been placed on the first game state attribute and the subset of game state attributes.

9. A computer-implemented method for updating a game state in an online game, the method being implemented in a computer system comprising one or more physical processors, the method comprising:

executing an instance of a virtual space;

implementing the instance of the virtual space to facilitate participation by one or more players in a game within the virtual space by determining view information from the instance and transmitting the view information to one or more client computing platforms associated with the one or more players that facilitate presentation of views of the virtual space to the one or more players by the one or more client computing platforms;

receiving a plurality of commands from the one or more players, the plurality of commands including a first command from a first player and a second command from a second player, wherein the first command affects a first game state attribute of the game state of the online game;

responsive to a determination that the first command affects the first game state attribute of the game state, locking the first game state attribute;

determining whether one or more other game state attributes of the game state are related to the first game state attribute;

responsive to a determination that a subset of game state attributes of the one or more other game state attributes are related to the first game state attribute, placing a lock on individual ones of the subset of game state attributes;

determining one or more of the game state attributes of the plurality of game state attributes the second command affects, wherein the second command affects the first game state attribute of the game state of the online game;

determining whether a lock indication associated with the first game state attribute indicates that the first game state attribute is locked;

responsive to the lock indication associated with the first game state attribute indicating that the first game state attribute is locked, holding the second command such that the second command is not immediately executed within the online game;

executing the first command; and removing the locks on the first game state attribute and the subset of related game state attributes subsequent to executing the first command.

10. The method of claim 9, wherein the game state comprises game state information related to the plurality of game state attributes, wherein game state information related to an individual game state attribute comprises an identifier for the individual game state attribute, a value associated with the individual game state attribute, the lock indication indicating whether the game state attribute has been locked, and relationship information for the individual game state attribute.

11. The method of claim 10, wherein the relationship information for the individual game state attribute may comprise a list of one or more game state identifiers associated with respective one or more game state attributes related to the individual game state attribute.

12. The method of claim 10, wherein the relationship information for the individual game state attribute may comprise a position in a hierarchical tree comprising the plurality of game state attributes.

13. The method of claim 12, wherein the subset of game state attributes related to the first game state attribute comprises:

one or more game state attributes connected to the first game state attribute in the hierarchical tree.

14. The method of claim 9, wherein locking the first game state attribute comprises:

responsive to a determination that the lock indication indicates that the first game state attribute has been locked, placing the second command in a queue associated with the first game state attribute.

15. The method of claim 14, wherein placing the lock on the subset of game state attributes comprises:

determining, for individual ones of the subset of game state attributes, whether lock indications associated with the individual ones of the subset of game state attributes indicate that the individual ones of the subset of game state attributes have been locked;

responsive to a determination that the lock indications indicate that the individual ones of the subset of game state attributes have been locked, placing the second command in a queue associated with the individual ones of the subset of game state attributes.

16. The method of claim 15, wherein executing the first command comprises: executing the first command responsive to a determination that the lock has been placed on the first game state attribute and the subset of game state attributes.

17. A non-transitory electronic storage media storing information related to updating a game state in an online game, the stored information comprising:

a memory configured to store information related to the online game;

instructions configured to cause a client computing platform to:

execute an instance of a virtual space;

implement the instance of the virtual space to facilitate participation by one or more players in the online game within the virtual space by determining view information from the instance and transmitting the view information to one or more client computing platforms associated with the one or more players that facilitate presentation of views of the virtual space to the one or more players by the one or more client computing platforms;

receive a plurality of commands from the one or more players, the plurality of commands including a first command from a first player and a second command from a second player;

responsive to a determination that the first command affects the first game state attribute of the game state, lock the first game state attribute;

determine whether one or more other game state attributes of the game state are related to the first game state attribute;

responsive to a determination that a subset of game state attributes of the one or more other game state attributes are related to the first game state attribute, place a lock on individual ones of the subset of game state attributes;

determine one or more of the game state attributes of the plurality of game state attributes the second command affects, wherein the second command affects the first game state attribute of a game state of the online game;

determine whether a lock indication associated with the first game state attribute indicates that the first game state attribute is locked;

responsive to the lock indication associated with the first game state attributed indicating that the first game state attribute is locked, hold the second command such that the second command is not immediately executed within the online game;

execute the first command; and remove the locks on the first game state attribute and the subset of related game state attributes subsequent to the execution of the first command.

* * * * *